(12) United States Patent
Edelson (10) Patent No.: US 9,302,541 B2
(45) Date of Patent: Apr. 5, 2016

(54) SPRAG CLUTCH ASSEMBLY FOR AIRCRAFT DRIVE WHEEL DRIVE SYSTEM

(71) Applicant: Borealis Technical Limited, North Plains, OR (US)

(72) Inventor: Jonathan Sidney Edelson, North Plains, OR (US)

(73) Assignee: Borealis Technical Limited, Gibraltar (GI)

( * ) Notice: Subject to any disclaimer, the term of this patent is extended or adjusted under 35 U.S.C. 154(b) by 167 days.

(21) Appl. No.: 14/158,774

(22) Filed: Jan. 17, 2014

(65) Prior Publication Data

US 2015/0204397 A1 Jul. 23, 2015

(51) Int. Cl.
| F16D 41/069 | (2006.01) |
| F16D 41/07 | (2006.01) |
| B64C 25/44 | (2006.01) |
| B60B 27/00 | (2006.01) |
| B64C 25/40 | (2006.01) |
| F16D 41/14 | (2006.01) |
| F16D 27/00 | (2006.01) |
| B60B 25/12 | (2006.01) |

(52) U.S. Cl.
CPC ........... *B60B 27/0021* (2013.01); *B64C 25/405* (2013.01); *F16D 41/14* (2013.01); *B60B 25/12* (2013.01); *B60Y 2200/51* (2013.01); *F16D 27/00* (2013.01)

(58) Field of Classification Search
CPC ...... B64C 25/405; B64C 25/42; B64C 25/44; B60B 27/0015; B60B 27/0021; F16D 41/061; F16D 41/069; F16D 41/07
See application file for complete search history.

(56) References Cited

U.S. PATENT DOCUMENTS

| 3,075,623 | A |   | 1/1963 | Lund |
| 3,599,767 | A | * | 8/1971 | Sederquist ................... 192/43.1 |
| 3,702,649 | A | * | 11/1972 | Giese .......................... 192/41 A |
| 4,347,921 | A | * | 9/1982 | Bordes ........................ 192/41 A |
| 4,617,838 | A |   | 10/1986 | Anderson |
| 5,067,598 | A | * | 11/1991 | Ritter et al. ................ 192/223.2 |
| 6,657,334 | B1 |   | 12/2003 | Edelson |
| 6,838,791 | B2 |   | 1/2005 | Edelson |
| 7,116,019 | B2 |   | 10/2006 | Edelson |
| 7,445,178 | B2 | * | 11/2008 | McCoskey et al. ............. 244/50 |
| 7,469,858 | B2 |   | 12/2008 | Edelson |
| 7,661,329 | B2 |   | 2/2010 | Cali et al. |
| 8,672,333 | B2 | * | 3/2014 | Hartman .......................... 280/3 |
| 2004/0003976 | A1 | * | 1/2004 | Pederson et al. ............. 192/45.1 |
| 2006/0273686 | A1 |   | 12/2006 | Edelson et al. |
| 2007/0158497 | A1 | * | 7/2007 | Edelson et al. ............ 244/103 S |
| 2009/0045024 | A1 | * | 2/2009 | Ruth ............................ 192/43.1 |
| 2012/0126053 | A1 | * | 5/2012 | Christensen et al. .......... 244/50 |
| 2013/0217529 | A1 | * | 8/2013 | Gunji et al. ...................... 475/1 |

* cited by examiner

*Primary Examiner* — Christopher P Ellis
*Assistant Examiner* — Michael Wang (57) ABSTRACT

A sprag clutch assembly for an aircraft drive wheel drive system capable of moving an aircraft autonomously on the ground in both forward and reverse directions is provided. The clutch is mounted within an aircraft drive wheel to be operatively engaged to control drive means braking torque when the aircraft is driven in a forward or reverse direction. The clutch assembly includes a plurality of pivoted sprag elements activatable to transmit torque and configured so that ratcheting occurs only when the aircraft drive wheel is driven in a forward direction and a braking torque is applied when the aircraft drive wheel is driven in reverse when the relative speed of the drive system is slower than the drive wheel speed, thereby permitting the drive system drive motor to function as a brake when the clutch assembly is engaged and the aircraft is reversing.

12 Claims, 3 Drawing Sheets

SPRAG CLUTCH ASSEMBLY FOR AIRCRAFT DRIVE WHEEL DRIVE SYSTEM

TECHNICAL FIELD

The present invention relates generally to clutch assemblies for drive wheels and particularly to a sprag clutch assembly for an aircraft drive wheel drive system designed to activate a drive-actuated drive means to move an aircraft autonomously and efficiently in a forward and reverse directions as required during ground operations.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become a high priority in the management of airport ground operations. The safe and efficient ground movement of a large number of aircraft simultaneously into and out of ramp and gates areas has become increasingly important. As airline fuel costs and safety concerns and regulations have increased, the airline industry is beginning to acknowledge that continuing to use an aircraft's main engines to move aircraft during ground operations is no longer the best option. The delays, costs, and other challenges to timely and efficient aircraft pushback from airport terminals associated with the use of tugs and tow vehicles makes this type of aircraft ground movement an unattractive alternative to the use of an aircraft's main engines to move an aircraft on the ground. Restricted use of an aircraft's engines on low power during arrival at or departure from a gate is an additional, although problematic, option. Not only does such engine use consume fuel, it is also burns fuel inefficiently and produces engine exhaust that contains microparticles and other products of incomplete combustion. Operating aircraft engines, moreover, are noisy, and the associated safety hazards of jet blast and engine ingestion in congested gate and ramp areas are significant concerns that cannot be overlooked.

The use of a drive means, such as an electric motor, mounted with an aircraft wheel to rotate the wheel of an aircraft to drive the aircraft on the ground without using the aircraft's main engines has been proposed. Various drive means and motors intended to drive aircraft during ground operations are described in the art. For example, an aircraft electric taxi system with a friction-actuated bi-directional clutch mounted with a gear system and the aircraft's brakes on main landing gear wheels is described in U.S. Patent Application Publication No. US2012/0126053 to Christensen et al. The owner and inventors of the present invention have, in addition, developed and implemented an aircraft drive system that uses electric drive motors to power aircraft nose or main landing gear wheels to effectively move an aircraft autonomously during ground operations without reliance on the aircraft's main engines or external vehicles. The prior art, however, does not suggest an aircraft drive wheel drive mechanism with a clutch-activated drive system that actuates electric drive means to selectively produce a braking torque on a drive wheel as the drive wheel, and the aircraft, are moved by the drive mechanism only in a reverse direction.

The drive means currently proposed to drive aircraft on the ground typically rely on gearing systems that operate with the drive means to drive an aircraft wheel and, thus, the aircraft. Traction drives, such as that described in U.S. Pat. No. 4,617, 838 to Anderson, available from Nastec, Inc. of Cleveland, Ohio, which relies on ball bearings, can be used to replace gears in some contexts. Adapting roller or traction drive systems to replace gearing and/or gear systems in an aircraft drive wheel to actuate drive means that independently drive an aircraft drive wheel has not been suggested, nor has the use of a clutch assembly specifically designed to controllably activate such roller traction drive systems or drive means to selectively produce drive means braking torque been mentioned.

Many types of vehicle clutch assemblies are well known in the art. U.S. Pat. No. 3,075,623 to Lund; U.S. Pat. No. 3,599,767 to Soderquist; and U.S. Pat. No. 7,661,329 to Cali et al, for example, describe clutch assemblies incorporating sprag or pawl elements that may transmit torque between races or rotatable elements depending, in part, on their relative directions of rotation. Neither these clutch designs nor other commonly available clutch designs are sufficiently robust to function effectively and reliably in an aircraft drive wheel system to controllably engage a drive system and selectively actuate a drive means as required to operate as a brake only when needed, such as when an aircraft is driven autonomously in reverse during ground operations.

A need exists, therefore, for an effective and reliable clutch assembly specifically designed to selectively engage an aircraft drive wheel drive system with a highly efficient drive system-actuated drive means that drives an aircraft drive wheel to move the aircraft autonomously on the ground without reliance on the aircraft's main engines or external ground vehicles. A need particularly exists for such a clutch assembly that is specifically designed to selectively provide braking torque to the drive system-actuated drive means to permit or prevent operation of the drive means as a brake.

SUMMARY OF THE INVENTION

It is a primary object of the present invention, therefore, to overcome deficiencies of the prior art and to provide a clutch assembly specifically designed to operatively engage an aircraft drive wheel drive system with a highly efficient drive system-actuated drive means that is selectively controllable to drive an aircraft drive wheel to move the aircraft autonomously in a forward or in a reverse direction on the ground without reliance on the aircraft's main engines or external ground vehicles.

It is another object of the present invention to provide a clutch assembly that is specifically designed to selectively provide braking torque to the drive system-actuated drive means to permit or prevent operation of the drive means as a brake when the drive wheel moves the aircraft during ground operations.

It is another object of the present invention to provide a clutch assembly that is specifically designed to selectively engage an aircraft drive wheel drive system-actuated drive means to enable the drive means to operate as a brake when the drive wheel moves the aircraft in reverse during ground operations.

It is an additional object of the present invention to provide a clutch assembly designed to be integrated within an aircraft drive wheel drive system that includes clutch elements configured to be in selective operative engagement or disengagement with a roller traction drive system actuating a drive means capable of driving an aircraft wheel and, therefore, an aircraft, autonomously during ground operations as required by speed and direction of rotation of the aircraft wheel.

It is a further object of the present invention to provide a clutch assembly for an aircraft drive wheel drive system with a safe overrunning bidirectional clutch configured to prevent or permit the application of braking torque by the drive system drive means as required when the aircraft drive wheel is driving the aircraft in a forward or in a reverse direction.

It is yet another object of the present invention to provide a clutch assembly for an aircraft drive wheel drive system with a roller traction gear or drive assembly that includes a plurality of pawl or sprag clutch elements specifically shaped to selectively engage or disengage the drive system depending on the direction of rotation of the drive wheel and the speed of the drive wheel relative to the drive system speed.

It is yet a further object of the present invention to provide a clutch assembly for an aircraft drive wheel drive assembly with an electric drive motor, wherein the clutch assembly is designed to prevent the motor from acting as a brake when the drive wheel is rotating to drive the aircraft in a forward direction at high speed.

It is a still further object of the present invention to provide a clutch assembly for an aircraft drive wheel drive assembly with an electric drive motor, wherein the clutch assembly is designed to engage the drive assembly and allow the motor to act as a brake when the drive wheel is rotating to drive the aircraft in a reverse direction.

In accordance with the aforesaid objects, a clutch assembly is provided that is specifically designed to operate with an aircraft drive wheel drive assembly that includes a drive means actuated by a drive system to drive an aircraft wheel and move the aircraft autonomously in a desired forward and/or reverse on the ground without reliance on the aircraft's engines or external vehicles. The clutch assembly is operatively mounted with the drive system and the drive means within the aircraft drive wheel where the clutch can be selectively engaged and disengaged to control torque transmission to the drive system as required by the relative speeds of the drive means and drive wheel during forward and reverse movement of the drive wheel.

One embodiment of a clutch assembly suitable for this purpose includes a plurality of pawl or sprag elements movably positioned between spaced inner and outer clutch elements and/or the aircraft wheel to transmit torque between these elements and thereby activate a drive assembly, which then actuates an aircraft wheel drive means to drive the aircraft to move the aircraft on the ground. The pawl or sprag elements are configured to prevent the drive means from acting as a brake or to permit the drive means to act as a brake, as appropriate, when the aircraft wheel is moving in a forward or in a reverse direction. The clutch assembly may also include sensor means that monitors engagement and disengagement of one arrangement of sprags in the assembly and is in communication with a controller so that engagement of the clutch assembly can be prevented under conditions when actuation of the drive means should be avoided.

Other objects and advantages will be apparent from the following description, claims, and drawings.

DESCRIPTION OF THE INVENTION

The benefits of being able to efficiently and safely move an aircraft during ground operations without reliance on the aircraft's main engines or external vehicles have long been recognized. Actually achieving these benefits, however, has proved challenging. Applicant's previously proposed aircraft wheel drive means have been demonstrated to effectively power drive wheels and move aircraft on the ground and, thus, can enable aircraft operators to achieve the advantages of autonomous ground movement. The present invention improves the capabilities of Applicant's original aircraft drive wheel drive system and expands the advantages possible when aircraft can be driven during ground operations by controllable onboard drive means independently of the aircraft's main engines and external ground vehicles. These advantages and improvements are achieved, in large part, by the design of an aircraft drive wheel drive system, which incorporates a clutch assembly-activated drive system to control operation of the drive means. The present invention provides additional improvements to a clutch assembly that enhance aircraft autonomous ground travel capabilities whether the aircraft is moving in a forward or in a reverse direction.

Figure 1:
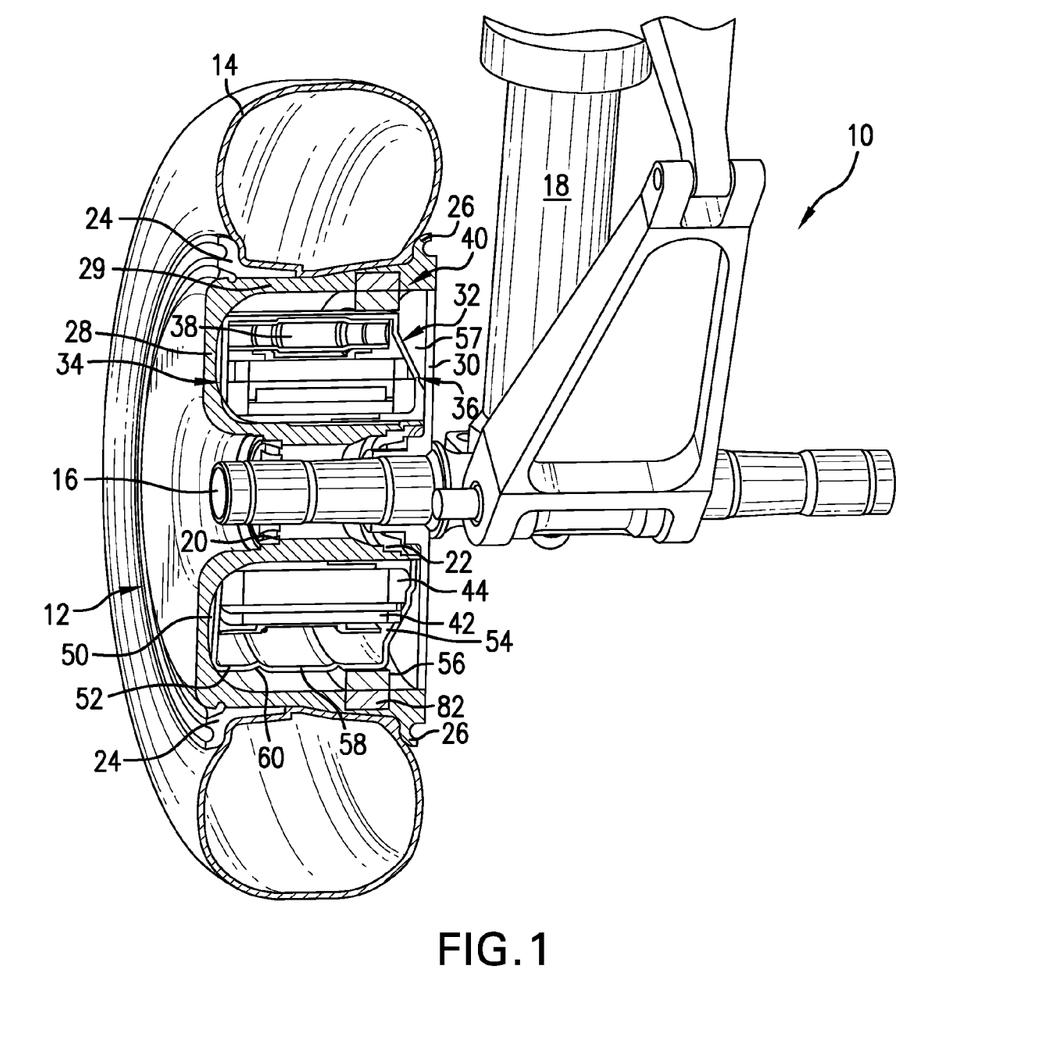
FIG. 1 is a cross-sectional perspective schematic view of a portion of an aircraft landing gear and a landing gear drive wheel illustrating a clutch assembly according to the present invention mounted within an aircraft drive wheel with a drive system and a drive means.

Referring to the drawings, FIG. 1 shows, in cross-sectional perspective view, a portion of an aircraft landing gear 10 and a landing gear wheel 12 with an aircraft drive wheel drive system, including a clutch assembly according to the present invention, mounted within the landing gear wheel. Although only one landing gear wheel is shown in detail, it is contemplated that one or more nose landing gear wheels, one or more main landing gear wheels, or a combination of nose and main landing gear wheels could be equipped with clutch assemblies in drive wheel systems as described herein. In one possible arrangement, for example, equipping both wheels in a two-wheel nose landing gear with an aircraft drive wheel system as described herein provides the capability not only to effectively move the aircraft on the ground, but also to differentially steer and brake the aircraft by selective activation of the drive means of each wheel. The present invention allows even more effective use of the system drive means as a brake when the aircraft is traveling in reverse.

A tire 14 is shown mounted on the wheel 12. The wheel 12 and tire 14 are rotatably mounted on an axle 16 attached to the landing gear 10. The landing gear 10 includes a central piston 18 and other standard landing gear structures (not identified) typically found in an aircraft nose or main wheel landing gear. The wheel 12 is rotatably supported on the axle 16 by support structures, such as the bearing arrangements 20 and 22 shown adjacent to the axle 16. Other suitable support structures or bearings could also be used for this purpose. The wheel 12 preferably has the two part configuration shown in FIG. 1, although other wheel designs could also be employed in connection with the present sprag clutch assembly.

Removal and remounting of the tire 12 is facilitated by providing a demountable tire flange 24, preferably on an outboard side of the wheel 12, so that it can be removed when necessary. A stationary tire flange 26 is provided to hold an opposite side of the tire 14. The stationary tire flange is preferably integrally formed with an upper portion 29 of a substantially "C"-shaped outboard wheel wall section 28 that forms most of the wheel, although this position may change if the relative positions of the drive system components are changed from what is shown. A smaller inboard wheel wall section 30 connects to the outboard wheel section 28 to define a maximum space or volume within the wheel 12 where components of a drive wheel drive system can be mounted. To provide a clearer view of the main components of a preferred aircraft drive wheel system, elements, such as, for example, the tire valve stem, are not shown.

Figure 2:
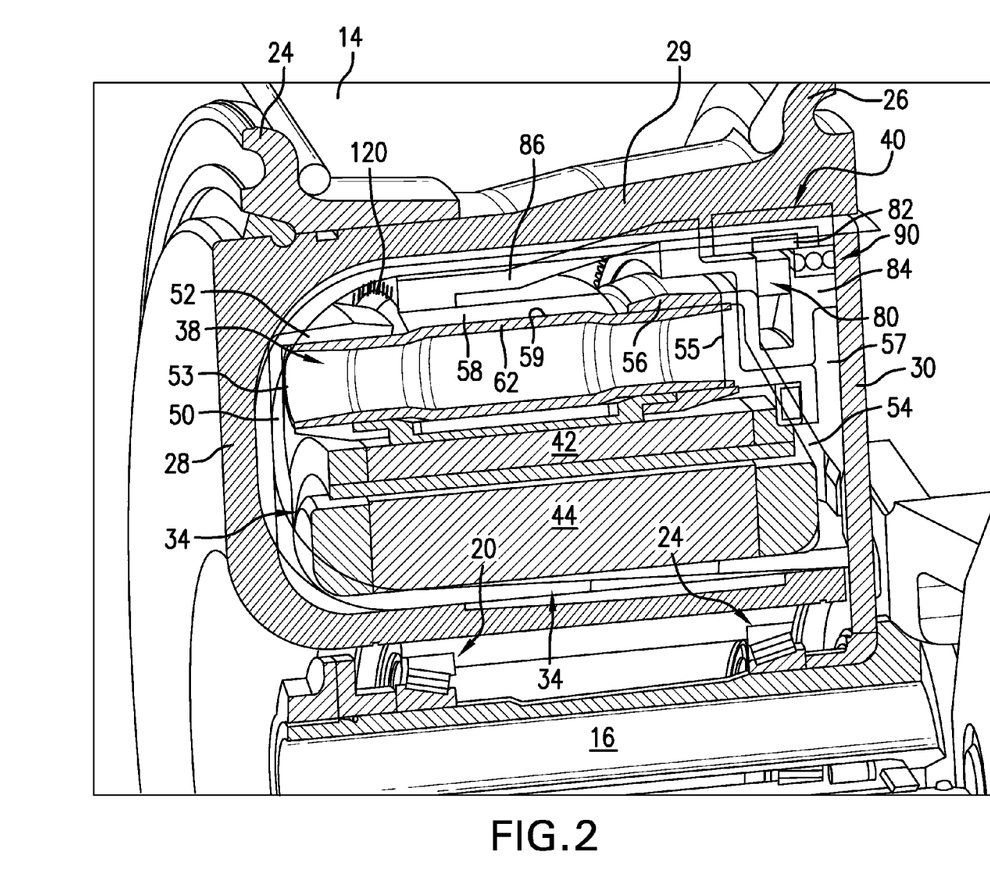
FIG. 2 is a diagrammatic view of a portion of the aircraft landing gear drive wheel of FIG. 1, showing one possible arrangement of the relative locations of the clutch assembly of the present invention, a drive system, and a drive means within a space in the wheel defined to hold these system components.

One possible configuration and arrangement of components of a preferred drive wheel drive system 32, including the clutch assembly of the present invention, is shown in FIGS. 1 and 2. Other functionally equivalent arrangements and configurations are also contemplated to be within the scope of the present invention. In the configuration shown, the components of the drive system 32 are enclosed within a system housing 34 that is shaped to fit substantially completely within the space created by the arrangement of the respective outboard and inboard wall sections 28 and 30 of the wheel 12. The main elements of the drive wheel drive system include a drive means 36, a drive system 38, and a clutch assembly 40, which is shown schematically. These drive system elements may be positioned as shown in FIGS. 1 and 2 or in other suitable positions and locations. Although not shown, the clutch assembly 40 may be located outboard of the landing gear piston 18 near the demountable tire flange 24 or in any other functionally effective location. In the arrangement shown, the components of the drive means 36 and the drive system 38 are not centered within the wheel space, but are positioned within the system housing 34 so that the outboard edges of these structures are in substantially parallel alignment with the outboard wheel wall 28. As a result, the system housing 34 has the asymmetrical configuration shown. Other arrangements and relative positions of the drive means 36 and drive system 38 are also contemplated to be useful with the sprag clutch assembly of the present invention.

The term "drive means," as used herein, refers to a controllable onboard or engines-off drive motor that enables an aircraft wheel to be driven autonomously on the ground without reliance on the aircraft's main engines or external vehicles. A preferred drive means or motor 36 includes a rotating element, such as a rotor 42, and a stationary element, such as a stator 44. The rotor 42 is preferably located externally of the stator 44, as shown, but other drive means component arrangements could also be used and are contemplated to be within the scope of the present invention. For example, the positions of the rotor 42 and stator 44 could be reversed so that the rotor is internal to the stator.

A drive means 36 preferred for use with the aircraft drive wheel drive system of the present invention is an electric motor assembly that is capable of operating at high speed and could be any one of a number of suitable designs. An example of one type of drive means that could be used effectively in the present system is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move an aircraft wheel and function as described herein may also be suitable drive means in the present drive wheel system. A high phase order electric motor of the kind described in, for example, U.S. Pat. Nos. 6,657,334; 6,838,791; 7,116,019; and 7,469,858, the disclosures of the aforementioned patents are incorporated herein by reference, can be effectively used as a drive means 36. One type of suitable drive means 36 is a high phase order induction motor with a top tangential speed of about 15,000 linear feet per minute and a maximum rotor speed of about 7200 rpm, although drive means capable of a wide range of such speeds would be used with the present drive wheel system. Other drive means, including hydraulic and/or pneumatic drive means, are also contemplated to be useful with the clutch assembly of the present invention.

The system housing 34 is specifically designed to operatively enclose the drive means 36 and the drive system 38, as well as to operatively support the clutch assembly 40 as it is controlled to engage and disengage the drive system 38 and/or actuate the drive means 36. FIG. 2 shows one possible arrangement of the clutch assembly 40 and other structures of the drive system 36 in greater detail than they appear in FIG. 1. The system housing 34 encloses and/or supports the aircraft drive wheel drive system components completely within the space available in an aircraft drive wheel. The system housing 34, shown in FIGS. 1 and 2, may be formed in sections as shown to include an outboard section 50 that extends from the stationary element 44 of the drive means substantially parallel to the wheel wall 28 toward the wheel section 29 to form an outboard lip 52 that contacts and wraps around an outboard end 53 of the drive system 38. An inboard section 54 of the motor housing 34 is angled from the stationary element 44 toward the horizontal upper wheel section 29 to form an inboard lip 56 that contacts and wraps around an inboard end 55 of the drive system 38. The inboard lip 56 is interposed between an outer surface of the drive system inboard end 55 and the clutch assembly 40. A circumferential central system housing section 58 is disposed between the housing outboard lip 52 and inboard lip 56 and contacts an output surface 59 of the drive system. This three-part arrangement of the system housing can also be seen clearly in the lower part of FIG. 1.

The drive system 38, which is positioned between the drive means 36 and the system housing sections 52, 56, and 58, is not shown in the lower part of the wheel 12 in FIG. 1, providing a clearer view of the system housing sections. It will be noted that circumferential gaps 60 are provided between the central circumferential section 58 and the outboard and inboard lip portions 52 and 56 of the system housing to permit thermal expansion of housing sections during operation. Other housing configurations are also contemplated for use with the present clutch assembly.

An inboard recess 57 between the system housing wall 54 and the inboard wheel wall 30 may provide space to accommodate components of the clutch assembly 40, when it is positioned as shown. The inboard system housing section 54 and recess 57 could also direct and receive wiring (not shown) from the drive means elements, sensors, and/or other components that must be attached to wiring. This wiring may be a wire harness or other convenient wiring arrangement that ultimately connects the drive wheel components to the aircraft electrical system and/or a source of electrical power.

The drive system 38 is a system that performs essentially the same functions that would be performed by gearing or a gear system. The replacement of gearing by a drive system, particularly by a preferred roller traction drive system, in an aircraft drive wheel drive system presents many advantages.

In particular, a roller traction drive system that is designed to actuate a drive means capable of moving a commercial sized aircraft on the ground not only has a low profile and is light weight, but also provides the high torque and high speed change ratio required to optimally operate the drive means to move an aircraft on the ground. Unlike a gear system, a roller traction drive system has substantially zero backlash and can be made of dry running components that do not require lubrication. Planetary and other gear systems are capable of only limited gear ratios, while an infinite gear ratio is possible with a preferred roller traction drive system. A preferred roller traction drive system is, in addition, self-energizing. Other advantages of integrating a roller traction drive system with an aircraft drive wheel drive means and the sprag clutch assembly of the present invention to drive an aircraft wheel and move an aircraft on the ground can also be realized.

One type of roller traction drive system 38 particularly preferred for use in the aircraft drive wheel system of the present invention employs a series of rollers, preferably arranged in two rows and positioned within opposed motive surfaces or "races," so that a respective inner or outer row of rollers contacts an inner or outer race. The rollers, which are preferably hollow cylinders, contact the motive surfaces with pure rolling contact and low friction and, therefore, are highly efficient. Rollers, particularly hollow cylindrical rollers, do not demonstrate the high levels of friction and/or wear that characterizes gears typically used to drive a motor or other drive means. A range of different configurations of roller traction drive systems and other drive systems that satisfy the parameters described above could be activated by the clutch assembly of the present invention to actuate a drive means in an aircraft drive wheel to move the aircraft effectively and efficiently during ground operations.

The clutch assembly 40 of the present invention can be activated automatically or manually to engage and disengage the drive system 38 into and out of actuation with the drive means 36 so that the drive means is actuated to move an aircraft landing gear drive wheel in a forward and in a reverse direction to drive an aircraft on the ground or, when appropriate, de-actuated so that the drive means is unable to drive the aircraft wheel. The drive system should only be engaged by the clutch assembly to actuate the drive means when the aircraft is actually on the ground, such as after landing and prior to takeoff, and when the aircraft is traveling at a desired speed during ground travel. Engagement and disengagement of the clutch assembly 40 could be targeted to the speed of the aircraft wheel 12 and/or to speeds of drive wheel system components, including the speed of the drive means 36 and the drive system 38. The present clutch assembly preferably includes one or more failsafe mechanisms that prevent the clutch assembly 40 from engaging the drive system 38 when the aircraft landing gear wheels are not supporting the aircraft on the ground, such as, for example, when the aircraft is in flight and at other times when an aircraft landing gear wheel should not be driven.

As noted above, the clutch assembly 40 may be located in an inboard portion of an aircraft wheel, such as within the recess 57 adjacent to the system housing inboard lip section 56 as shown schematically in FIG. 1 and in more detail in FIG. 2, in an outboard portion of the wheel, or in another wheel location, which are not shown. A circumferential clutch assembly recess 82, configured to receive a correspondingly configured circumferential clutch component 80, which could be an outer race 94 as discussed below, is provided in the wheel section 29. This arrangement enables the clutch diameter to be press fit into the recess 82 if needed to ensure disengagement of the clutch assembly. A clutch assembly housing member 84 is provided adjacent to the recess 82 and is preferably positioned between the inboard wheel wall 30 and the drive system housing inboard wall 54 to enclose and support clutch assembly elements. The clutch assembly housing member 84 is designed to include an extension 86 in contact with the system housing central section 58, which is adjacent to a drive system 38 output member 62. The clutch assembly 40 is preferably operatively positioned to move into and out of engagement with a drive system 38 output, such as member 62. Other functionally equivalent clutch assembly and drive system structures are could also be provided and are contemplated to be within the scope of the present invention.

The clutch assembly should preferably include both automatic and manual or override clutch control means (not shown) to control operation of the clutch to engage or disengage the drive system 38. A fully automatic clutch control means programmed to engage or disengage the clutch from the drive system with an automatic or manual override feature is preferred. When the drive system 38 is disengaged, the clutch control means moves the clutch assembly component 80 so that it is press fitted into the recess 82 and the clutch assembly is not in operable contact with the drive system 38, and the drive system 38 cannot actuate the drive means 36. During engagement, the clutch assembly is in operative contact with the drive system 38. The clutch assembly 40 could be any one of a number of clutch designs suitable for the purpose described.

Figure 3:
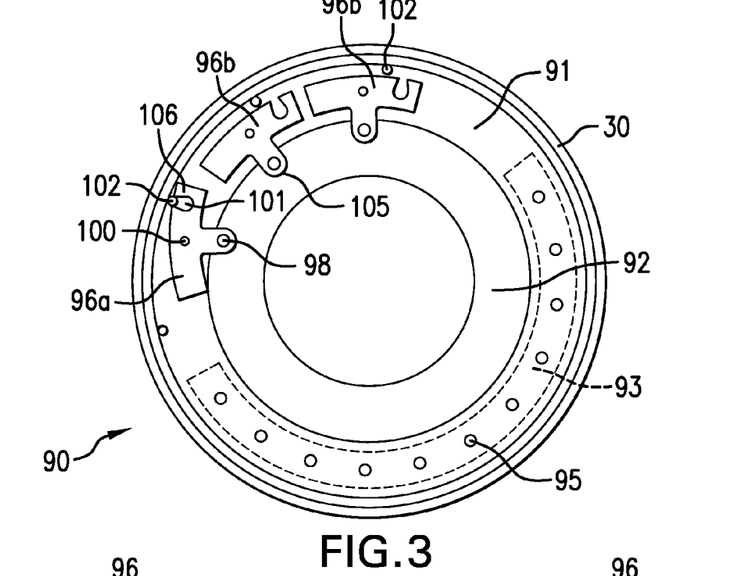
FIG. 3 is a schematic representation of a portion of one embodiment of clutch assembly elements according to the present invention.
Figure 4:
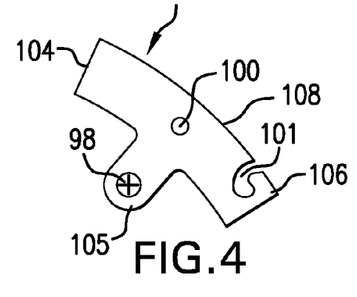
FIG. 4 shows one embodiment of a single sprag or pawl configuration for the clutch assembly of FIG. 3.

One preferred type of clutch design 90 useful for the clutch assembly of the present invention is shown in FIGS. 3 and 4. This type of clutch generally includes a circumferential inner clutch element or inner race 92 spaced radially inwardly of a circumferential outer clutch element or outer race 94, with a set of sprags or pawls 96 arranged circumferentially in an annular space 91 between the inner race 92 and the outer race 94. The term "sprag" as used herein is also intended to include sprags, pawls and like elements. Each sprag 96 may be generally configured to allow free rotation of the inner race 92 when it is rotated in a counterclockwise direction. When the inner race 92 is rotated in a clockwise direction, the sprags 96 may transmit torque from the inner race 92 to the outer race 94. The clockwise rotation of the outer race 94 may cause this race to move freely, while the counterclockwise rotation of the outer race 94 may transmit torque from the outer race 94 to the inner race 92. Springs may be included to exert a low level of rotary pressure on the sprags 96 to ensure that engagement of the freely moving race occurs without backlash.

There are many possible configurations of sprags, pawls, and like elements that could be used in a clutch assembly in accordance with the present invention. In one arrangement of clutch components according to a first embodiment of the present invention, sprags are mounted on an inner race or inner clutch element to pivot into and out of engaging contact with an outer race or outer clutch element that may be attached to an aircraft wheel. Alternatively, the sprags may be designed to directly contact the aircraft wheel 30, instead of an outer race. The terms "outer race," as used herein, are intended to include an outer race, an outer race attached to an aircraft wheel, and the aircraft wheel itself. It is contemplated that whichever outer race structure is used will function substantially the same as the outer race 94, described in connection with FIGS. 3-6.

In one pawl configuration and arrangement described in commonly owned co-pending application Ser. No. 14/929,328, entitled Clutch Assembly for Aircraft Drive Wheel Drive System, the disclosure of which is fully incorporated herein, the sprags or pawls are symmetrical and include an angled side that allows the sprag to ratchet if the aircraft drive wheel is moving faster than the drive system output. If the drive system is unintentionally engaged when the drive wheel is rotating at high speed, this configuration and the resulting ratcheting action prevent the drive means, preferably an electric motor, from operating as a brake, which, in some circumstances, could be an unsafe condition. There are, however, situations in which it is highly desirable for an aircraft drive wheel drive motor to be capable of braking action, such as when the aircraft is being driven in reverse.

The present invention provides a clutch assembly with an asymmetrical sprag configuration that is designed to permit ratcheting only when the drive wheel is rotating to move the aircraft in a forward direction on the ground and simultaneously prevents the application of braking torque by the system or the operation of the drive motor as a brake as the aircraft moves forward. The present clutch assembly sprag configuration allows the drive system drive means or motor to operate as a brake when the drive wheel is rotating to move the aircraft in a reverse direction on the ground. The preferred asymmetrical sprag configuration is designed to permit or prevent ratcheting, depending primarily on the drive wheel direction of rotation. When the aircraft drive wheel is rotating in reverse, and the drive system output is rotating more slowly than the wheel is rotating, engagement of the clutch enables the system to apply a braking torque rather than ratcheting. A preferred sprag configuration that achieves these results is shown and described in connection with FIGS. 3-6 and includes a hook or similarly shaped element on an outer extent of the sprag that is designed to engage a corresponding pin on an outer race.

In a preferred clutch assembly according to the present invention, power is provided to the assembly by an input ring, such as the inner race 92, to which a plurality of sprags 96 are pivotally attached through pivot pins 98. A drag link ring, partially represented in dashed lines at 93 in FIG. 3, supports a plurality of pins 95 shaped and spaced to "ride" in slots 100 located in sprags 96. An output ring, which can be the outer race 94 as described above, includes pins 102 shaped and spaced to engage sprags 96. Normally the sprag slots 100 are not engaged by the drag link ring pins 95 and may be held by springs or other biasing elements (not shown) in a disengaged position as rotation of the inner race 92 causes the drag link ring 93 to rotate. One possible arrangement of spring-biased sprags and corresponding engaging structures on a ring like a drag link ring is shown and described in U.S. Pat. No. 3,599, 767, the disclosure of which is incorporated herein by reference.

When the clutch assembly of the present invention is in operation, a set of magnets (not shown) may be energized to pull against a stop or a brake structure (not shown) in the clutch assembly. This causes rotation of the drag link ring 93 to slow relative to the rotational speed of the inner race 92. The two pins (95, 98) associated with each sprag 96 move relative to each other, and the sprag rotates to compensate so that one outer edge of the sprag moves toward the inner race 92 and the opposite outer edge of the sprag moves toward the outer race 94. Rotation of the inner race 92 causes the drag link ring 93 to rotate at the sane speed when the drag link ring pins 95 are engaged by the sprag slots 100. The drag link ring may speed up if the sprags are caused to rotate differently than just described. When the drag link ring 93 moves more slowly than the inner race 92, the sprags 96 may pivot, but the pins (95, 98) will maintain the same relative distance.

In the clutch embodiment shown in FIG. 3, the clutch components are arranged so that a plurality of sprags 96 are pivotally mounted on an inner race or clutch element 92 and can be engaged on or disengaged indirectly from an aircraft wheel 30 through outer race 94, depending, in part, on the direction of rotation of the aircraft wheel and/or the relative speed of the wheel and drive means or other drive system components. Output torque from the clutch assembly sprags 96 may be directed to the aircraft wheel 30, which is shown attached to the outer race 94. The number of sprags used may vary and will typically cover the annular space 91 between the inner race 92 and the outer race 94. Only three sprags 96 are shown in FIG. 3. Two of the sprags 96b are shown disengaged, and the third sprag 96a is shown rotated and engaged on a pin 102. An arrangement of 6 to 10 circumferentially spaced sprags and suitable system software may be used to avoid engagement shocks because speed differences will be small. Other numbers of sprags are also contemplated to be within the scope of the present invention.

Each sprag 96 is preferably asymmetrically shaped. One outer circumferential extent or edge of each sprag 96 has an angled fin 104. The opposite circumferential extent or edge of each sprag 96 includes a hook element 106. A pivot pin 98, which may be located in a central lobe 105 on the sprag, pivotally attaches the sprag to the inner race 92. Other attachment arrangements that allow the requisite sprag pivotal movement could also be used. The hook element 106, which can have the configuration shown or any other functional hook type of configuration, is designed to engage a correspondingly configured pin 102 on an outer race 94, on a clutch element, or on an adjacent portion of an aircraft wheel, such as wheel inboard wall 30 in FIGS. 1 and 2. The pins 102 in FIG. 3 are located on the outer race 94.

Figure 5:
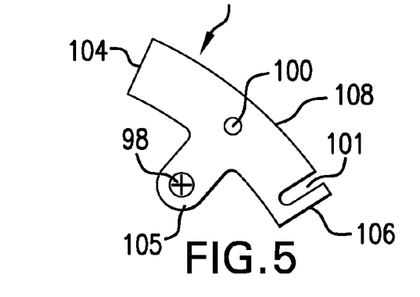
FIG. 5 shows another embodiment of a single sprag or pawl configuration for the clutch assembly of FIG. 3.
Figure 6:
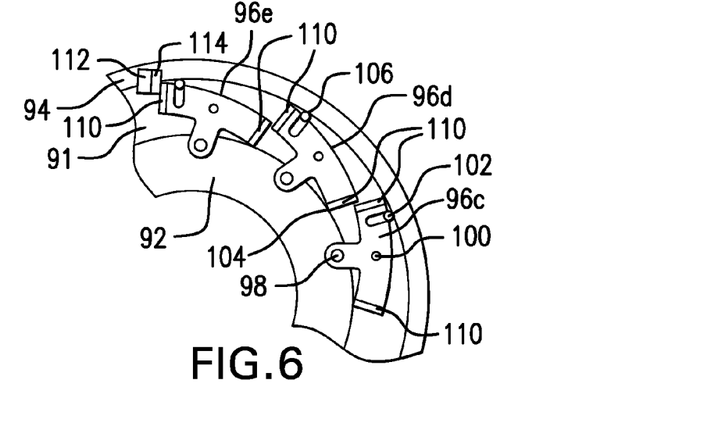
FIG. 6 shows a variation of the first embodiment of the clutch assembly of the present invention wherein disengagement of the clutch assembly can be monitored and confirmed.

The sprags 96 are designed to have a shape that prevents their improper engagement on the pins 102 and that enables them to change direction when the driven rotational direction of the aircraft wheel 12 changes. One possible configuration of the sprag hook element 106 is shown in FIGS. 3, 4, and 6, and another is shown in FIG. 5. AS shown and described, each sprag 96 preferably includes a hook element 106 opposite the angled fin 104 at opposed extents of the sprag on either side of the central lobe 105. The hook element 106 may have any one of a number of configurations in addition to those shown and described herein. Whether the hook has the curved shape of FIGS. 3, 4, and 6, a more slot-like shape, as in FIG. 5, or any other shape, a pin receptacle 101 portion of the hook must be designed to enable the sprag hook element 106 to engage a pin 102. The shape of the pin 102 may be varied, as required, to ensure engagement with pin receptacle 101.

Each sprag additionally has a curved outer edge 108, which connects the hook element 106 and the fin 104 and preferably conforms to the radius of curvature of the outer race 94, wheel wall 30, or other curved structure on which the pins 102 are positioned. The asymmetric shapes of the outer edges of the sprags 96 should be chosen to allow the sprags to continue to ratchet when one outer edge pivots outwardly and is not engaged, as well as to prevent ratcheting when the opposite outer edge pivots outwardly and is engaged to capture a clutch assembly or drive system output. It may be desirable in some instances to provide springs (not shown) to urge the sprags 96 into or out of engagement with the pins 102, depending on the relative locations of the pins 102 and the pin receptacles 101.

Sprag 96a in FIG. 3 is shown in a ratcheted position in which torque is applied in a forward direction, and the drive means or motor 36 is prevented from operating as a brake. Sprag 96b, in which the pin receptacle 101 does not engage a pin 102, is shown in a disengaged position. If the aircraft drive wheel is rotating in a reverse direction with the drive system output rotating slower than the drive wheel and the clutch assembly sprags are in the engaged position represented by sprag 96a, rather than ratcheting, the system will apply a braking torque.

An additional embodiment of the present clutch assembly is shown in FIG. 6. Engagement of the drive system and actuation of the drive means to drive an aircraft should occur only when the aircraft is moving at a desired optimum or selected speed during ground travel and never during flight. To ensure that the clutch assembly is disengaged or is engaged only when appropriate, each sprag 96 may be provided with an electrical contact element 110 at the outermost extent of the hook element 106 and fin 104 ends of each sprag as shown. When the sprags 96c, 96d, and 96e are in the positions shown in FIG. 6, they are in engagement with the pins 102. When the sprags are in these positions, an electrical contact 110 on a hook element 106 end of sprag 96c contacts an electrical contact 110 on a fin 104 of adjacent sprag 96d. Likewise, an electrical contact 110 on hook element 106 end of sprag 96d contacts an electrical contact 110 on fin 104 of sprag 96e. A sensor 112 is provided with a corresponding electrical contact 114, so that electrical contact 110 on hook element 106 end of sprag 96e contacts the electrical contact 114 on the sensor 112, completing an electrical circuit and indicating that all of the sprags are in an engaged position.

An additional sprag configuration (not shown) could also be provided in accordance with the present invention. In this embodiment, instead of a fin end 104, the sprag is symmetrical and has two hook ends like the hook end 106 shown in FIGS. 3-6. The hook could have the rounded pin receptacle type of shape shown in FIGS. 3 and 4, the slot shape of FIG. 5, or any other convenient hook design. This symmetrical configuration would allow ratcheting and braking in both forward and rear directions.

As noted above, an electric coil (not shown) associated with the clutch assembly, when energized, causes the drag link ring 93 to move the sprags 96 into engagement, which requires an electric drive means or other source of electric power to be in communication with the sprags. When the sprags are in an engaged position as described above so that an electric current can flow through the plurality of sprags, this indicates that the clutch is engaged. That information is communicated to a central logic controller (not shown) and to the aircraft cockpit to indicate that the clutch assembly is fully engaged, which means that the aircraft drive wheel drive system is also engaged and able to move the aircraft autonomously on the ground in a forward direction without the application of drive means braking torque or in a reverse direction with the application of drive means braking torque as described herein. When the sprags 96c, 96d, and 96e are not engaged, no electric contact will be made between their electrical contacts 110, and this information will be communicated to the aircraft cockpit to indicate that the clutch assembly 90 is not engaged and the wheel drive system is not activated.

While the present invention has been described with respect to preferred embodiments, this is not intended to be limiting, and other arrangements and structures that perform the required functions are contemplated to be within the scope of the present invention.

INDUSTRIAL APPLICABILITY

The clutch assembly of the present invention will be most useful for operatively engaging wheel drive system components in an aircraft drive wheel drive system to move an aircraft autonomously on the ground in both forward and reverse directions to prevent or permit the drive system drive motor to operate as a brake and apply braking torque to the drive wheel and will find its primary applicability where it is desired to realize the benefits of moving an aircraft very efficiently on the ground in both forward and reverse directions without reliance on the aircraft's main engines or external ground vehicles.

The invention claimed is:

1. A clutch assembly for an aircraft drive wheel drive system designed to control autonomous ground movement of an aircraft, comprising:

an aircraft drive wheel drive system mounted completely within an aircraft landing gear wheel and operatively connected to said landing gear wheel to control rotation of said wheel during autonomous ground travel, comprising a drive means in driving contact with and powering rotation of said wheel at a desired speed, torque, and direction of rotation, and a drive system in actuating contact with said drive means to actuate said drive means;

a clutch assembly in activating contact with said drive system and said drive means controllable to selectively engage and disengage said drive system into and out of actuating contact with said drive means, wherein said clutch assembly comprises a circumferential inner clutch element, a circumferential outer clutch element spaced outwardly of said inner clutch element in activating contact with said drive system, and a plurality of asymmetric engagement elements pivotable to selectively engage or disengage a corresponding plurality of pin elements to prevent or permit braking torque transmission between said inner clutch element and said outer clutch element; and said plurality of engagement elements comprises a plurality of sprag elements configured with a radius of curvature to fit in a space between said inner clutch element and said outer clutch element and to pivot between an engaged position wherein each said sprag element is connected to a pin element to positively engage said outer clutch element and a disengaged position wherein said sprag element is disconnected from said pin element to disengage said outer clutch element; wherein each of said plurality of sprag elements is asymmetrically shaped to include a hook element at one circumferential extent and an angled fin at an opposite circumferential extent, and said hook element and said angled fin are positioned to extend outwardly along said inner clutch element from a central pivot holding said sprag element to said inner clutch element; and wherein said plurality of sprag elements are pivotally mounted on said inner clutch element so that a hook element of one sprag element contacts an angled fin of an adjacent sprag element, and each hook element and each fin includes an electrical contact positioned to contact an electrical contact on a hook element or a fin of an adjacent sprag element when said sprag elements are pivoted into engagement with said outer clutch element so that an electric circuit is completed when said sprag elements are in engaging contact with said outer clutch element and an electric current is supplied to said clutch assembly; and said clutch assembly further comprises a sensor located in electrical contact with at least one sprag element and in communication with a wheel drive system central controller.

2. The clutch assembly of claim 1, wherein said outer clutch element comprises a plurality of engagement pins corresponding to said plurality of sprag elements, and each of said plurality of sprag elements includes a corresponding pin receptacle for receiving one of said plurality of engagement pins to positively engage said outer clutch element.

3. The clutch assembly of claim 2, wherein said plurality of sprag elements is spaced circumferentially around said inner clutch element, and said sprag elements are mounted on said inner clutch element to pivot between a torque transmitting position wherein said pin receptacles engage said outer clutch element engagement pins and a torque transmission prevention position wherein said pin receptacles do not engage said outer clutch element engagement pins.

4. The clutch assembly of claim 3, wherein said drive system comprises a roller traction drive assembly in actuating communication between said clutch assembly and said drive means.

5. The clutch assembly of claim 1, wherein each of said plurality of sprag elements is sized and shaped to fit in an annular space between said inner clutch element and said outer clutch element and to pivot into and out of torque transmitting engagement with said outer clutch element or said aircraft wheel.

6. The clutch assembly of claim 1, wherein said hook element comprises a pin receptacle shaped to engage a corresponding engagement pin on said clutch outer element or on said aircraft wheel.

7. The clutch assembly of claim 6, wherein said pin receptacle comprises a curved receptacle or a slot-shaped receptacle, and said engagement pin is correspondingly shaped to ensure engagement with said curved receptacle or said slot-shaped receptacle.

8. The clutch assembly of claim 1, wherein said outer clutch element is attached to said aircraft wheel and said plurality of sprag elements are positioned to transmit torque between said inner clutch element and said aircraft wheel.

9. The clutch assembly of claim 8, wherein said engagement pins are located on said wheel, each said sprag element is configured to include a corresponding pin receptacle in said sprag hook element, and when said engagement pins are engaged by said pin receptacles to engage said inner clutch element and said wheel, said inner clutch element and said wheel are in torque transmission contact.

10. The clutch assembly of claim 9, wherein when said engagement pins are engaged by said pin receptacles and said aircraft wheel is driven in a reverse direction by said drive means, said inner clutch element and said wheel are in braking torque transmission contact, and when said engagement pins are engaged by said pin receptacles and said aircraft wheel is driven in a forward direction, said inner clutch element and said wheel are in forward torque transmission contact.

11. The clutch assembly of claim 1, further comprising a drag link ring element positioned between said inner and said outer clutch elements supporting said plurality of pin elements spaced on said drag link ring element to engage said plurality of engagement elements.

12. A method for selectively permitting or preventing operation of a drive means as a brake during aircraft ground travel using the clutch assembly of claim 1, comprising causing said sprags to ratchet when said engagement pins are engaged in pin receptacles in said hook elements, so that when said aircraft is driven in a forward direction by said drive system drive means, torque is applied in a forward direction and when said aircraft is driven in a reverse direction by said drive system drive means, braking torque is applied to said system.

* * * * *